(12) United States Patent
Kim et al.

(10) Patent No.: US 12,503,678 B2
(45) Date of Patent: Dec. 23, 2025

(54) CELL CULTURE APPARATUS

(71) Applicant: DAEGU GYEONGBUK INSTITUTE OF SCIENCE AND TECHNOLOGY, Daegu (KR)

(72) Inventors: Jin Young Kim, Daegu (KR); Hong Soo Choi, Daegu (KR); Eun Hee Kim, Goyang-si (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 628 days.

(21) Appl. No.: 17/920,880

(22) PCT Filed: Apr. 26, 2021

(86) PCT No.: PCT/KR2021/005231
§ 371 (c)(1),
(2) Date: Oct. 24, 2022

(87) PCT Pub. No.: WO2021/215894
PCT Pub. Date: Oct. 28, 2021

(65) Prior Publication Data
US 2023/0183624 A1 Jun. 15, 2023

(30) Foreign Application Priority Data
Apr. 24, 2020 (KR) .................. 10-2020-0050344

(51) Int. Cl.
*C12M 1/32* (2006.01)
*C12M 1/12* (2006.01)
*C12M 3/04* (2006.01)

(52) U.S. Cl.
CPC ............ *C12M 23/12* (2013.01); *C12M 23/06* (2013.01); *C12M 27/10* (2013.01)

(58) Field of Classification Search
CPC ....... C12M 23/12; C12M 23/06; C12M 27/10
(Continued)

(56) References Cited

U.S. PATENT DOCUMENTS

| | | | |
|---|---|---|---|
| 2013/0323839 A1* | 12/2013 | Takahashi | ............. C12M 25/00 435/395 |
| 2017/0219614 A1* | 8/2017 | Cook | .................. G01N 35/1065 |
| 2017/0253844 A1 | 9/2017 | Fang et al. | |

FOREIGN PATENT DOCUMENTS

| | | |
|---|---|---|
| JP | 2012-509663 | 4/2012 |
| JP | 5722347 | 5/2015 |

(Continued)

OTHER PUBLICATIONS

JP-2018174824-A Machine English Translation (Year: 2018).*
(Continued)

*Primary Examiner* — Michael L Hobbs
*Assistant Examiner* — Lenora A Abel
(74) *Attorney, Agent, or Firm* — LEX IP MEISTER, PLLC

(57) ABSTRACT

The present invention provides a cell culture apparatus. A cell culture apparatus according to one embodiment of the present invention is a cell culture apparatus for culturing a cell to form the cell into a three-dimensional spheroid. The cell culture apparatus may comprise: a plate; and a well which is arranged, in plural, on one side of the plate at predetermined intervals, has cells cultured inside, and has a micropattern disposed on the inner surface such that the inner surface and the cells are spaced apart from each other.

7 Claims, 11 Drawing Sheets

(58) Field of Classification Search
USPC .................................................... 435/299.1
See application file for complete search history.

(56) References Cited

FOREIGN PATENT DOCUMENTS

| | | | |
|---|---|---|---|
| JP | 2018-174824 | 11/2018 | |
| JP | 2018174824 A * | 11/2018 | |
| KR | 10-2015-0051199 | 5/2015 | |
| KR | 10-2019-0021179 | 3/2019 | |
| WO | WO-2016195480 A1 * | 12/2016 | ........ B01L 3/502715 |

OTHER PUBLICATIONS

Jin-Young Kim et al., "96-well format-based microfluidic platform for parallel interconnection of multiple multicellular spheroids", Journal of Laboratory Automation Society for Laboratory Automation and Screening, vol. 20,Nr:3, pp. 274-282, Dec. 2014.

* cited by examiner

CELL CULTURE APPARATUS

TECHNICAL FIELD

Embodiments of the present disclosure relate to a cell culture apparatus.

BACKGROUND ART

Conventional two-dimensional cell culture apparatuses may relatively easily facilitate cell culture, but have low bio-responsiveness and thus do not provide accurate biometric information. Further, the conventional two-dimensional cell culture apparatuses have difficulty in adjusting the sizes and positions of formed spheroids, and thus have reduced repeatability of culture.

Further, conventional three-dimensional cell culture apparatuses an have excessively complicated configuration due to many variables, such as the kinds and shapes of extra-cellular matrixes for biomimetics, cell culture factors, and the shapes of cell culture containers. Particularly, in the conventional three-dimensional [4] cell culture apparatuses, in order to prevent cells from being adhered to wells, a separate anti-cell adhesion coating layer is disposed on the bottom surfaces of the Such an anti-cell adhesion coating layer has low wells durability, and may thus be easily damaged by contact with a pipette or the like during cell culturing. The material of the removed anti-cell adhesion coating layer may be adsorbed to the cells, and may thus affect cell formation and observation.

The above information disclosed in this Background section is technical information that is possessed by the inventor(s) of the present disclosure so as to derive the present disclosure or is acquired by the inventor(s) during a process of deriving the present disclosure, and therefore it may contain information that does not form the prior art that is already known to general public before filling of the patent application.

DISCLOSURE

Technical Problem

Therefore, the present disclosure has been made in view of the above problems, and it is an object of the present disclosure to provide a cell culture apparatus which may culture cells into spheroids having uniform size and shape.

Technical Solution

In accordance with the present disclosure, the above and other objects can be accomplished by the provision of a cell culture apparatus configured to culture cells so as to form spheroids, the cell culture apparatus including a plate, and a plurality of wells arranged by a predetermined interval on one surface of the plate, provided to culture cells therein, and configured such that a fine pattern is disposed on inner surfaces of the wells so as to space the inner surfaces of the wells apart from the cells.

Each of the wells may include a guide wall formed in a cylindrical shape, and a culture recess configured to extend from one end of the guide wall, and formed in a downward convex shape so that the cells are aggregated in a center of the culture recess, and the fine pattern may be configured such that a plurality of protrusions and a plurality of depressions are repeatedly arranged on an inner surface of the culture recess.

The protrusions may protrude from the inner surface of the culture recess towards a center of the culture recess, each of the protrusions may have a contact surface configured to come into contact with the cells, and a total area of the contact surfaces of the protrusions may be equal to or less than a half of an entire area of the inner surface of the culture recess.

The protrusions may have a shape configured such that a width thereof is gradually reduced in a direction towards the center of the culture recess.

The fine pattern may include a support disposed on the inner surface of the culture recess, and the protrusions may extend from the support, and may protrude towards a center of the culture recess.

Each of the wells may further include a stopper disposed between the end of the guide wall and an end of the culture recess, and inclined towards an inside of a corresponding one of the wells at a predetermined angle.

Each of the wells may further include a meniscus area disposed in an upper end part of the culture recess, and configured such that the fine pattern is not formed in the meniscus area.

The fine pattern may be formed integrally with the wells.

The wells may be arranged in a plurality of rows and a plurality of columns on an upper surface of the plate, and the cell culture apparatus may further include storage tanks disposed on an upper surface of the plate so as to accommodate a fluid, and flow channels configured to connect the storage tanks to the plurality of wells in at least one of a row direction or a column direction so as to supply the fluid to the plurality of wells.

The cell culture apparatus may be rotated about a designated rotation shaft SO as to form a flow of the fluid.

Other objects, features and advantages of the present disclosure other than the above description will be more clearly understood from the following detailed description and the claims taken in conjunction with the accompanying drawings.

Advantageous Effects according one A cell culture apparatus to embodiment of the present disclosure may form three-dimensional spheroids, and may prevent cells from being adhered to the bottom surfaces of wells, thereby being capable of uniformly controlling the shapes and sizes of the spheroids.

The cell culture apparatus according to one embodiment of the present disclosure may prevent the cells or the spheroids from being damaged during a cell culture process, such as replacement of a culture fluid.

The cell culture apparatus according to one embodiment of the present disclosure allows a drug to flow to different spheroids cultured in the respective wells along flow channels, and may thus implement a multi-cell network.

MODE FOR INVENTION

Figure 1:
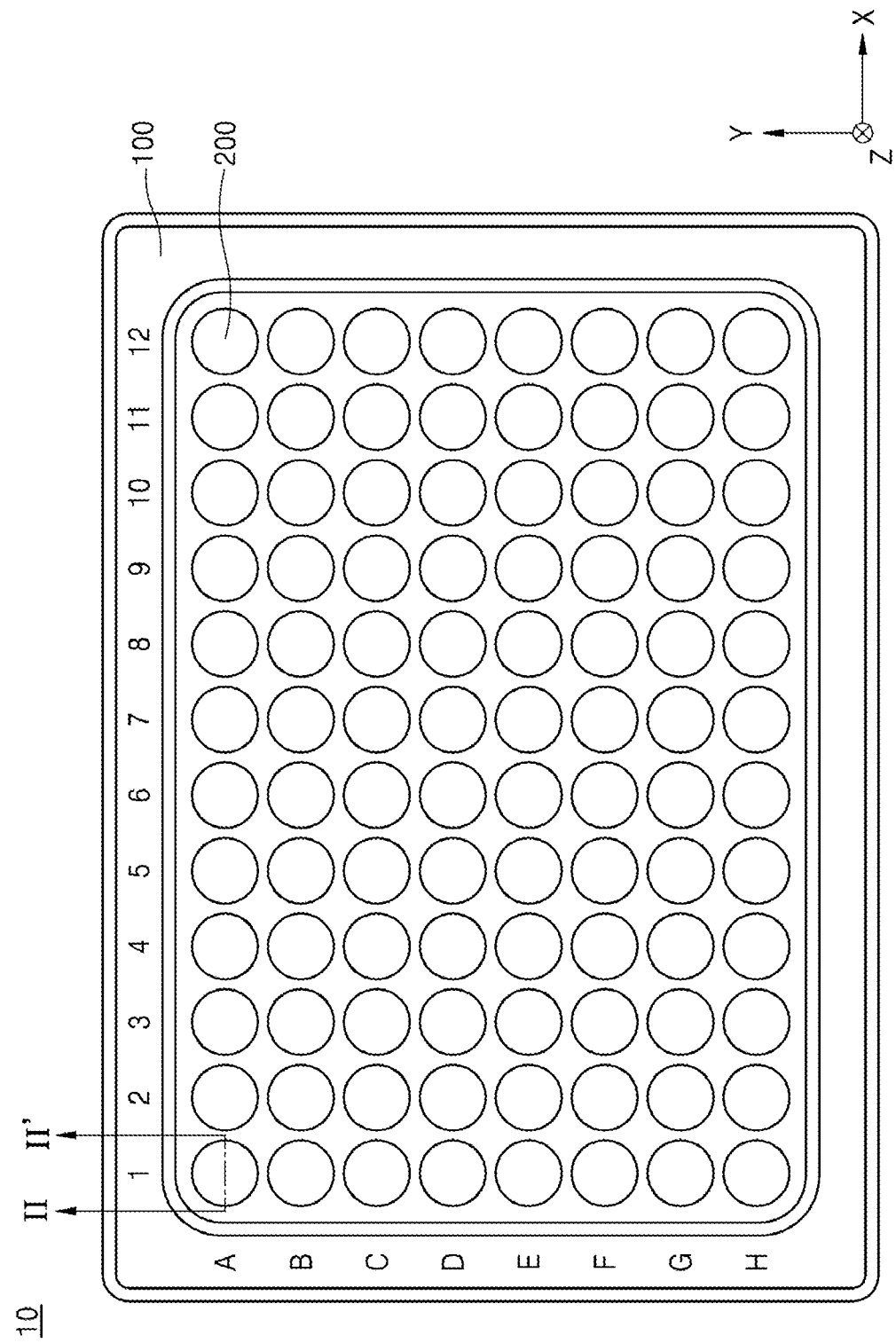
FIG. 1 is a view illustrating a cell culture apparatus according to one embodiment of the present disclosure.

Hereinafter, reference will now be made in detail to exemplary embodiments of the present disclosure, examples of which are illustrated in the accompanying drawings. However, the present disclosure is not limited to the embodiments set forth herein, and it is to be understood that the present disclosure is intended to cover various substitutions, changes and modifications which come within the spirit and scope of the present disclosure. In the following description of the present disclosure, like reference numerals designate like elements throughout the specification even though the elements are illustrated in different embodiments.

In the drawings, the thicknesses or sizes of respective elements may be exaggerated, omitted or schematically illustrated for convenience and clarity of explanation.

Further, the sizes or areas of the respective elements do not entirely reflect the actual sizes or areas thereof. In the following description of the embodiments, terms, such as "first" and "second", are used only to describe various elements, and these elements should not be construed as being limited by these terms. These terms are used only to distinguish one element from other elements.

The terminology used herein is for the purpose of describing particular embodiments only and is not intended to be limiting. In the following description of the present disclosure, the terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

In the following description of the present disclosure, the X-axis direction, the Y-axis direction and the Z-axis direction may respectively correspond to the width direction, length direction and height direction of a cell culture apparatus or a plate, unless stated otherwise.

Figure 2:
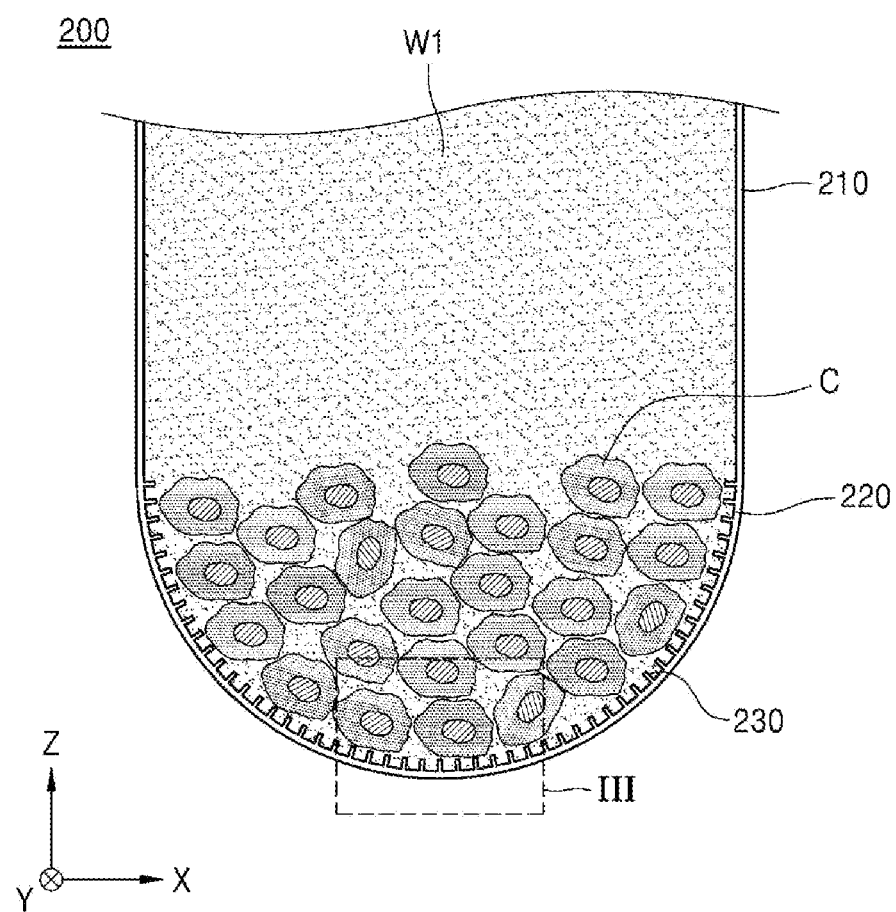
FIG. 2 is a longitudinal-sectional view taken along line II-II' of FIG. 1.

FIG. 1 is a view illustrating a cell culture apparatus 10 according to one embodiment of the present disclosure, FIG. 2 is a longitudinal-sectional view taken along line II-II' of FIG. 1, and FIGS. 3, 4 and 5 are enlarged views of portion III of FIG. 2.

Referring to FIG. 1, the cell culture apparatus 10 according to one embodiment of the present disclosure may be a 96-well plate or a 384-well plate which is generally used in cell culture tests. However, the number of wells 200 is not limited thereto, and may be varied depending on characteristics of cells to be cultured or the purpose of the tests. Hereinafter, it will be described that the number of wells 200 is 96 for convenience of the explanation.

Figure 3:
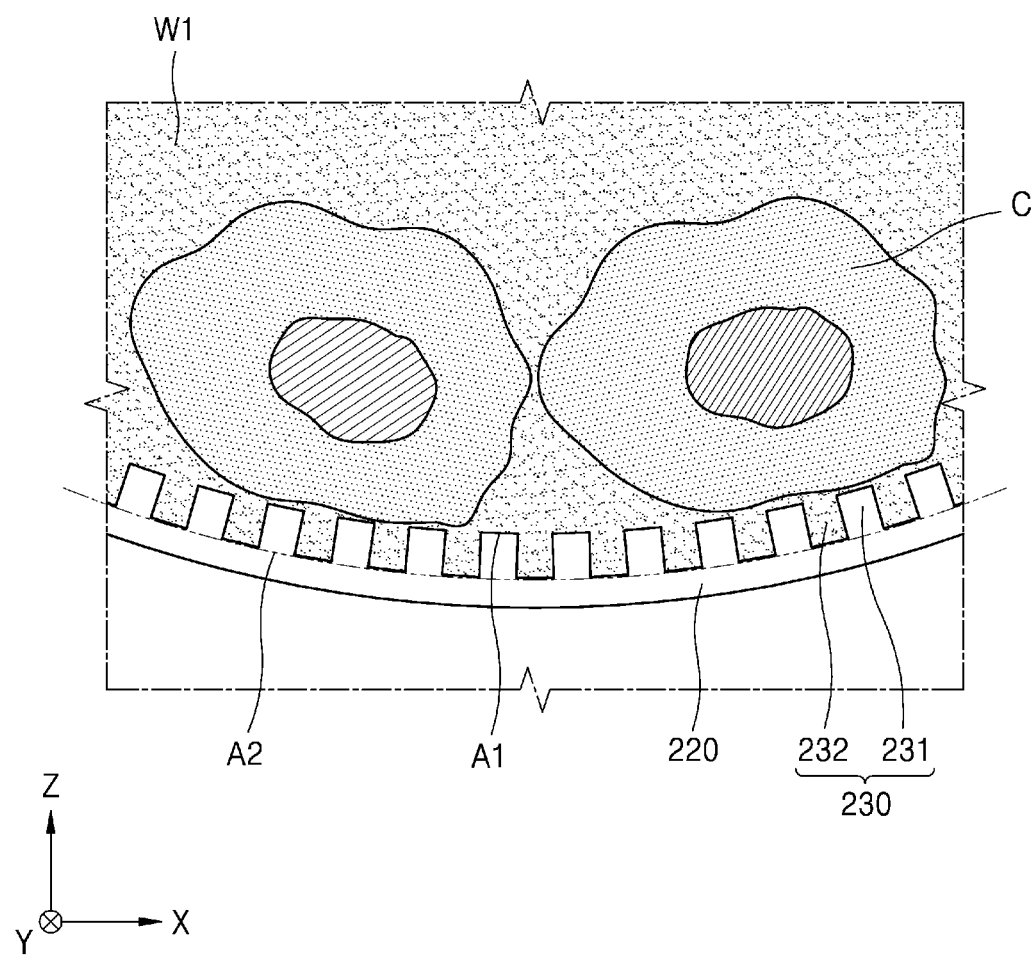
FIGS. 3, 4 and 5 are enlarged views of portion III of FIG. 2.

Referring to FIGS. 1 to 3, the cell culture apparatus 10 may include a plate 100 and the wells 200.

The plate 100 is a body of the cell culture apparatus 10, and may be a flat plate having a rectangular parallelepiped shape. In one embodiment, the plate 100 may be integrally manufactured through an injection process using plastic, such as polypropylene. However, the material of the plate 100 is not limited to plastic, and may be formed of quartz or the like. Hereinafter, it will be described that the plate 100 is formed of plastic for convenience of explanation.

A plurality of wells 200 may be arranged by a predetermined interval on one surface of the plate 100. In one embodiment, the wells may be formed integrally with the plate 100, and may be arranged in a plurality of rows and a plurality of columns on the upper surface of the plate 100. For example, as shown in FIG. 1, 96 wells 200 may be arranged in 8 rows (from row A to row H) and 12 columns (from column 1 to column 12) on the upper surface of the plate 100 in parallel. However, the number of the rows and the number of the columns in which the wells 200 are arranged are not limited to specific values, and may be combined in various ways, i.e., 12×8, 6×16, etc. Hereinafter, it will be described that the wells 200 are arranged in a matrix of 8×12 for convenience of explanation.

In one embodiment, a fine pattern 230 is disposed on the inner surfaces of the wells 200 so that cells C may be spaced apart from the inner surfaces of the wells 200.

As shown in FIG. 2, the cells C may be cultured in the well 200. For this purpose, a fluid W1 required to culture the cells 200 may be accommodated in the well 200, and the fluid W1 may be a culture fluid configured to culture the cells C therein. In one embodiment, the wells 200 may be U-shaped wells for three-dimensional cell culture.

The size and kind of the cells C are not particularly limited. In one embodiment, the size of the cells C may be 10 μm to 20 μm.

Each of the wells 200 may include a guide wall 210, a culture recess 220, and the fine pattern 230.

The guide wall 210 may extend from one surface of the plate 100 towards one side, and may thus form the outer wall of the well 200. In one embodiment, the guide wall 210 may be formed in a cylindrical shape which extends downwards along the Z-axis of the cell culture apparatus 10 from the upper surface of the plate 100. The guide wall 210 may define an inner space in which the fluid W1 is accommodated.

The culture recess 220 may extend from the guide wall 210, and may define a space in which the cells C or a spheroid S is cultured. In one embodiment, the culture recess 220 may extend from one end of the guide wall 210, and may define a culture space formed in a downward convex shape having a U-shaped cross section. Therefore, the cells C may be located to be concentrated in the center of the culture recess 220 by gravity or centrifugal force. Further, the cells C are grown in the center of the culture recess 200 so as to form the spheroid S, and thus, a position, at which the spheroid S is formed, and the size and shape of the spheroid S may be uniformly controlled.

The cross section of the culture recess 220 is not limited to the U shape, and may have any shape configured such that the cells C may be concentrated in the center of the culture recess 220. In another embodiment, the culture recess 220 may define a culture space formed in a downward convex shape having a V-shaped cross section.

The fine pattern 230 may be disposed on the inner surface of the culture recess 220. More concretely, as shown in FIG. 2, the fine pattern 230 may include protrusions 231 and depressions 232 which are repeatedly arranged along the inner surface of the culture recess 220. The fine pattern 230 may be disposed on the entirety or a part of the inner surface of the culture recess 220.

Referring to FIG. 3, the protrusions 231 may protrude from the inner surface of the culture recess 220 towards the center of the culture recess 220. The protrusions 231 may include a contact surface (not shown) coming into contact with the cells C or the spheroid S.

The shape of the protrusions 231 is not particularly limited, and, in one embodiment, the protrusions 231 may be formed in a rectangular parallelepiped shape.

The size of the protrusions 231 is not particularly limited, and may be less than the size of the cells C. In one embodiment, each of the width, length and height of the rectangular parallelepiped-shaped protrusions 231 may be 10 nm to 100 nm.

The size and shape of the depressions 232 arranged between the protrusions 231 are not particularly limited. Particularly, the size and shape of the depressions 232 may respectively correspond to the size and shape of the protrusions 231. Thereby, the fine pattern 230 may be disposed such that the protrusions 231 and the depressions 232 are repeatedly arranged to form a lattice structure.

Through the above-described configuration, a contact area of the culture recess 220 with the cells C may be greatly reduced.

More particularly, as shown in FIG. 3, in the case in which the fine pattern 230 is not formed, the contact area of the culture recess 220 with the cells C may be A2. In this case, the contact area of the culture recess 220 with the cells C is excessively large, and thus, force that adheres the cells C to the culture recess 220 becomes greater than force that aggregates the cells C together. Therefore, the cells C may not grow into a spheroid S having a uniform spherical shape, or may grow into a plurality of spheroids S at a plurality of positions of the culture recess 220, scatteringly.

On the other hand, in the cell culture apparatus 10 according to one embodiment of the present disclosure, as shown in FIG. 3, the cells C come into contact with the protrusions 231, the sum of the areas A1 of contact surfaces of the respective protrusions 231 with the cells C is much smaller than the contact area A2 of the culture recess 220 with the cells C. Thereby, cohesive force between the cells C becomes greater than force that adheres the cells C to the inner surface of the culture recess 220, and thus, the cells C may be aggregated together, and may grow into a single spheroid S having a uniform shape. Further, the spheroid S may be located in the center of the culture recess 220.

In one embodiment, the protrusions 231 and the depressions 232 may have shapes and sizes corresponding to each other, the sum of the areas of the contact surfaces of the protrusions 231 with the cells C may be equal to or less than a half of the entire area of the inner surface of the culture recess 220. That is, the sum of the areas A1 may be may be equal to or less than 0.5×A2.

Figure 4:
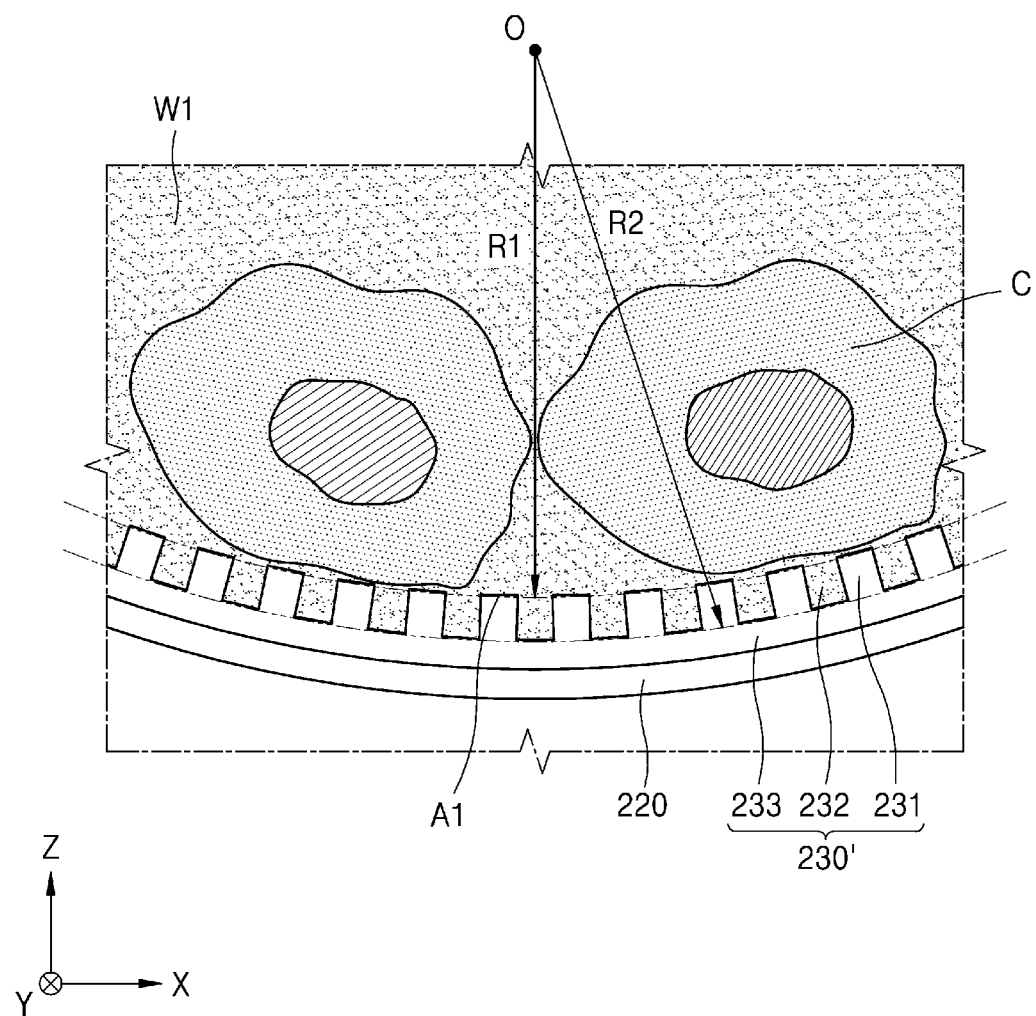

FIG. 4 is an enlarged view of portion III of FIG. 2. More concretely, FIG. 4 shows a fine pattern 230' according to another embodiment of the present disclosure.

As shown in FIG. 4, the fine pattern 230' according to another embodiment of the present disclosure may include protrusions 231, depressions 232 and a support 233.

The support 233 may be disposed along the inner surface of the culture recess 220, and the support 233 and the culture recess 220 may form a double-layered bottom surface of the well 200. The support 233 may be disposed on the entirety or a part of the inner surface of the culture recess 220.

Further, the protrusions 231 may protrude from the support 233 towards the center of the culture recess 220.

Through the above-described configuration, the position and shape of the spheroid S formed by aggregating the cells C may be more uniformly controlled.

More concretely, as shown in FIG. 4, the radius of curvature of the culture recess 220, i.e., the distance from the center of the culture recess 220 to an area in which the cell C comes into contact with the protrusions 231, may be reduced to R1 from R2.

Thereby, the cells C are more densely crowded in the center of the culture recess 220, and thus, a spheroid S having a more uniform shape may be formed. Further, the spheroid S may be more firmly located in the center of the culture recess 220.

The height of the support 233 is not particularly limited. As the height of the support 233 increases, the radius of curvature R1 is reduced, and thus, the spheroid S having a more uniform spherical shape may be cultured. The height of the support 233 may be properly selected in consideration of the purpose of the tests or the like.

Other elements of the fine pattern 230' are the same as those of the fine pattern 230, and a detailed description thereof will thus be omitted.

Figure 5:
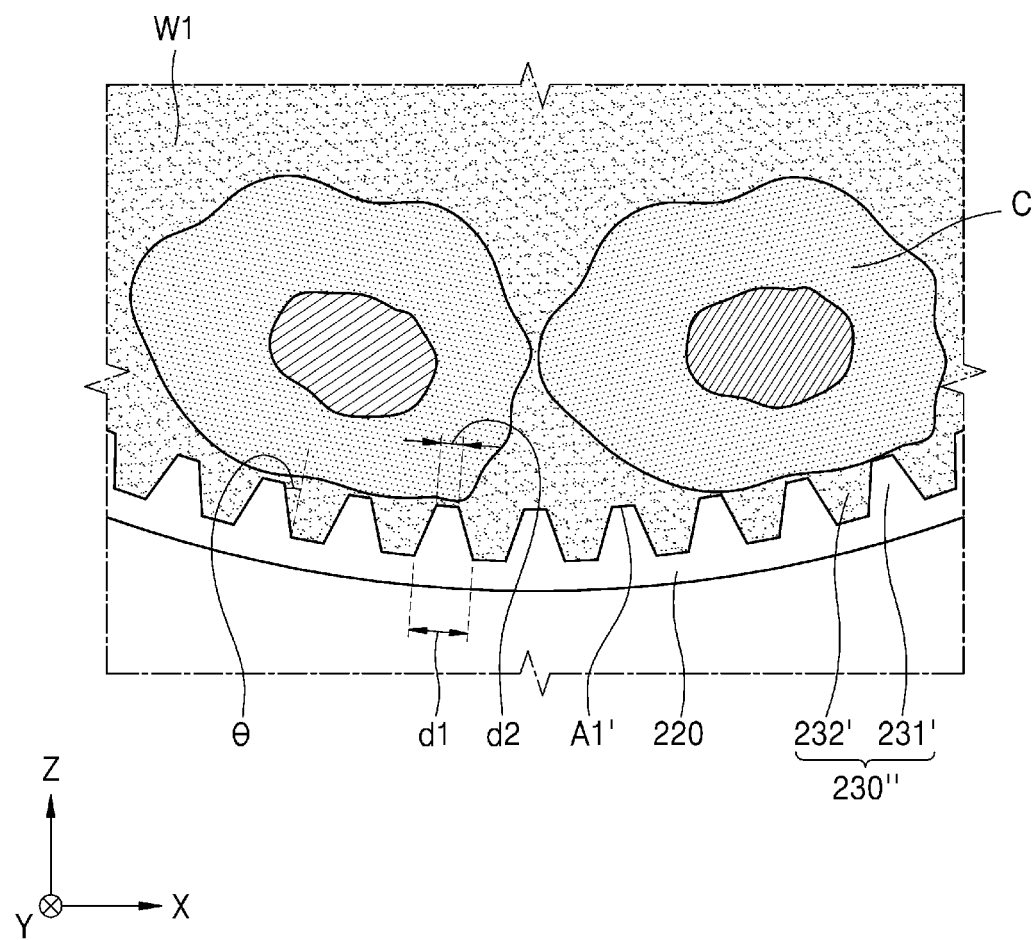

FIG. 5 is an enlarged view of portion III of FIG. 2. More concretely, FIG. 5 shows a fine pattern 230" according to yet another embodiment of the present disclosure.

As shown in FIG. 5, the fine pattern 230" according to yet another embodiment of the present disclosure may include protrusions 231' and depressions 232'.

The protrusions 231' may protrude from the inner surface of the culture recess 220 towards the center of the center of the culture recess 220 so as to be inclined. In one embodiment, the protrusions 231' may have a shape, the width of which is decreased as the protrusions 231' get close to the center of the culture recess 220 from the inner surface of the culture recess 220. Thereby, the protrusions 231' may be disposed such that the side walls thereof are inclined at an angle of θ from a line perpendicular to the bottom surfaces of the depressions 232'. Further, the protrusions 231' may have a shape, the width of which is gradually reduced from d1 to d2 in the direction towards the center of the culture recess 220.

Through the above-described configuration, contact areas A1' of the protrusions 231' with the cells C are further reduced, and thus, adhesion of the cells C to the inner surface of the culture recess 220 may be more firmly prevented. Thereby, cohesive force between the cells C becomes much greater than force that adheres the cells C to the inner surface of the culture recess 220, and thus, the cells C are more densely crowded in the center of the culture recess 220. Therefore, a spheroid S having a more uniform shape may be cultured.

Other elements of the fine pattern 230" are the same as those of the fine pattern 230, and a detailed description thereof will thus be omitted.

In one embodiment, the guide wall 210, the culture recess 220 and the fine pattern 230 may be formed integrally with each other. More concretely, the cell culture apparatus 10 according to one embodiment of the present disclosure may be manufactured by a plastic injection process. Here, the plate 100, the wells 200, and the guide walls 210, the culture recesses 220 and the fine patterns 230, which are included in the wells 200, may be formed integrally through the plastic injection process.

That is, the fine patterns 230 are not formed separately from the culture recess 220, and may be manufactured integrally with the cell culture apparatus 10 or the wells 200.

Therefore, a separate process to form the fine patterns 230 of the wells 200 is not required, and thus, a time taken to manufacture the cell culture apparatus 10 may be reduced.

Further, in contrast to the conventional cell culture apparatus which is coated with the separate anti-cell adhesion coating layer, the cell culture apparatus 10 according to one embodiment of the present disclosure includes the culture recess 220 and the fine pattern 230 which are formed integrally with each other, and may thus have improved durability. Therefore, there is no worry over damaging the anti-cell adhesion coating layer due to contact with a pipette or the like during a cell culture process. Further, secondary contamination is not caused by the damaged anti-cell adhesion coating layer, and thus, reliability of the tests may be increased.

Figure 6:
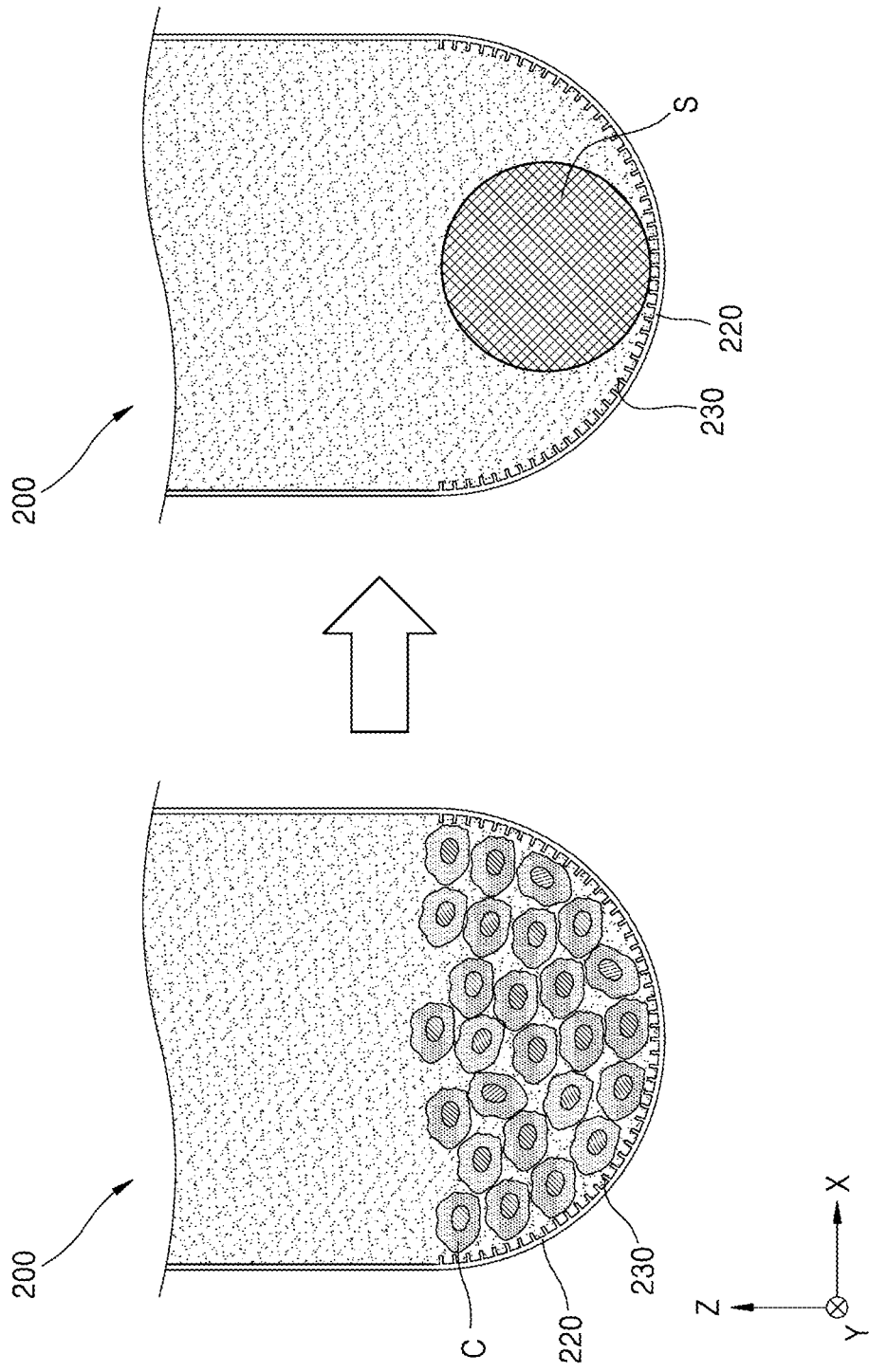
FIG. 6 is a view illustrating the state in which cells are cultured in a well shown in FIG. 1.

FIG. 6 is a view illustrating the state in which cells C are cultured in the well 200 shown in FIG. 1.

Referring to FIG. 6, in the case that the cells C are cultured using the cell culture apparatus 10 according to one embodiment of the present disclosure, three-dimensional spheroids S may be acquired.

In the cell culture apparatus 10 according to one embodiment of the present disclosure, the fine pattern 230 is formed on the inner surface of the culture recess 220, and thereby, the cells C may grow into the three-dimensional spheroid S having a uniform size due to reduction in the contact area between the cells C and the culture recess 220.

Further, since cohesive force between the cells C is greater than adhesive force between the cells C and the culture recess 220, the cells are not scatteringly located in the culture recess 220, and are aggregated into a single spheroid S, and thus, the single spheroid S may be located in the center of the culture recess 220.

Figure 7:
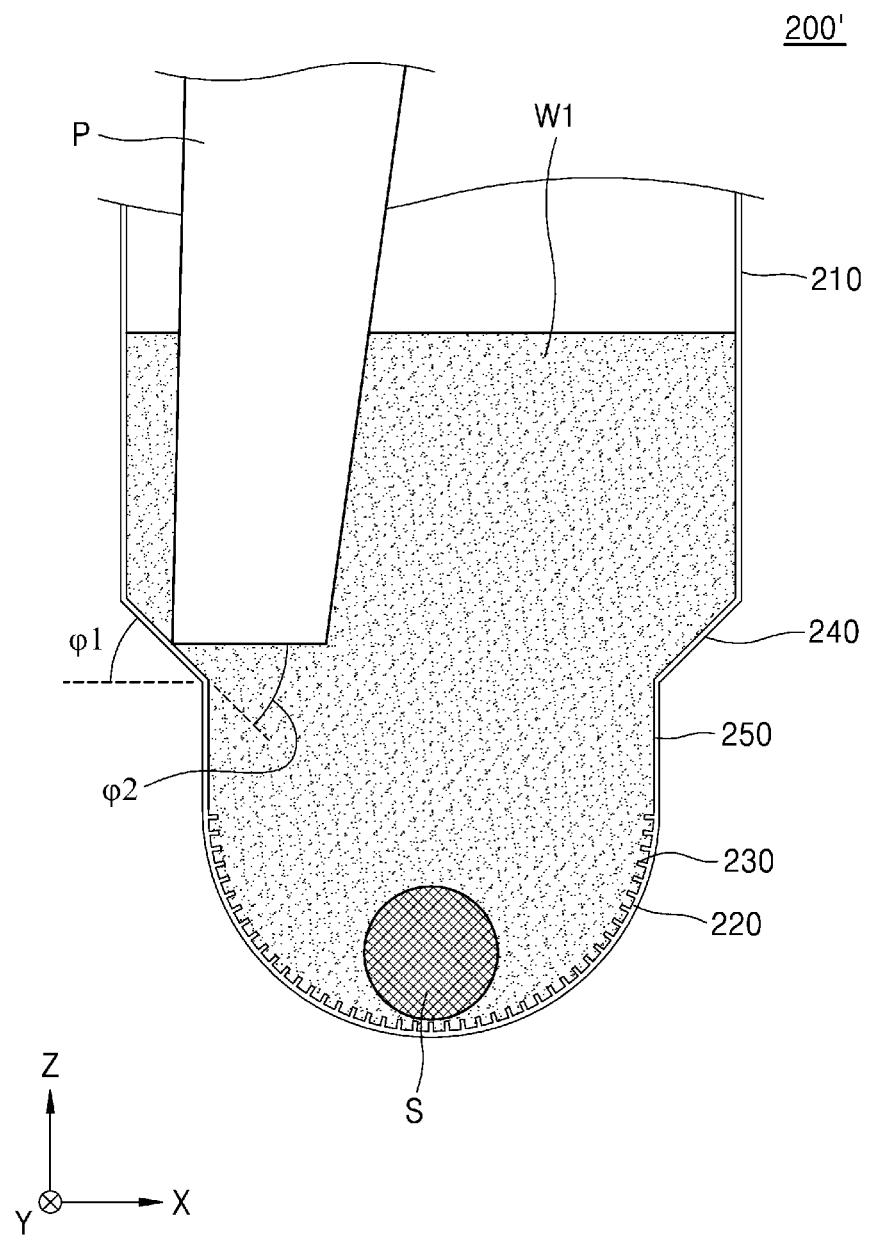
FIG. 7 is view illustrating a well according to another embodiment of the present disclosure.
Figure 8A:
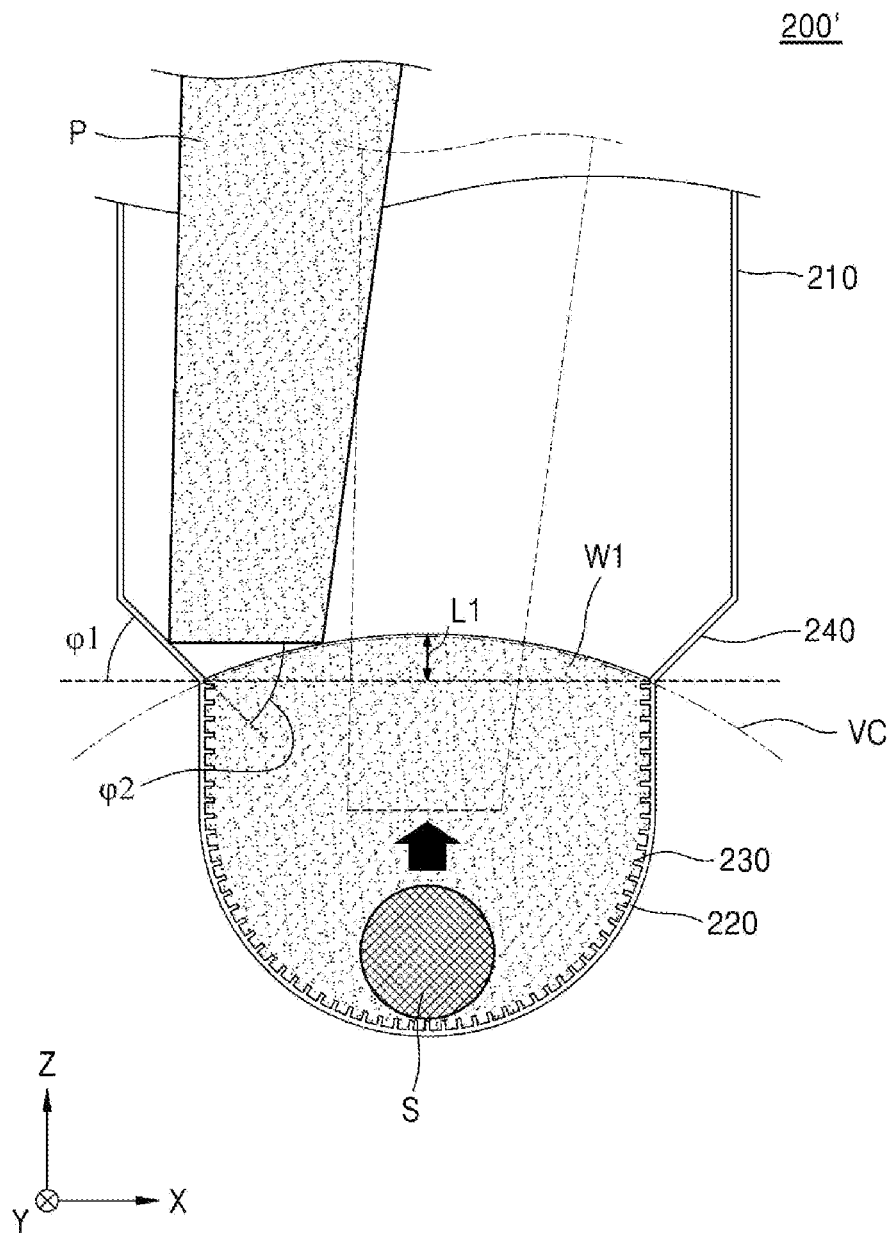
FIG. 8A is a view illustrating the state of a well according to a comparative example in which a fluid is replaced.
Figure 8B:
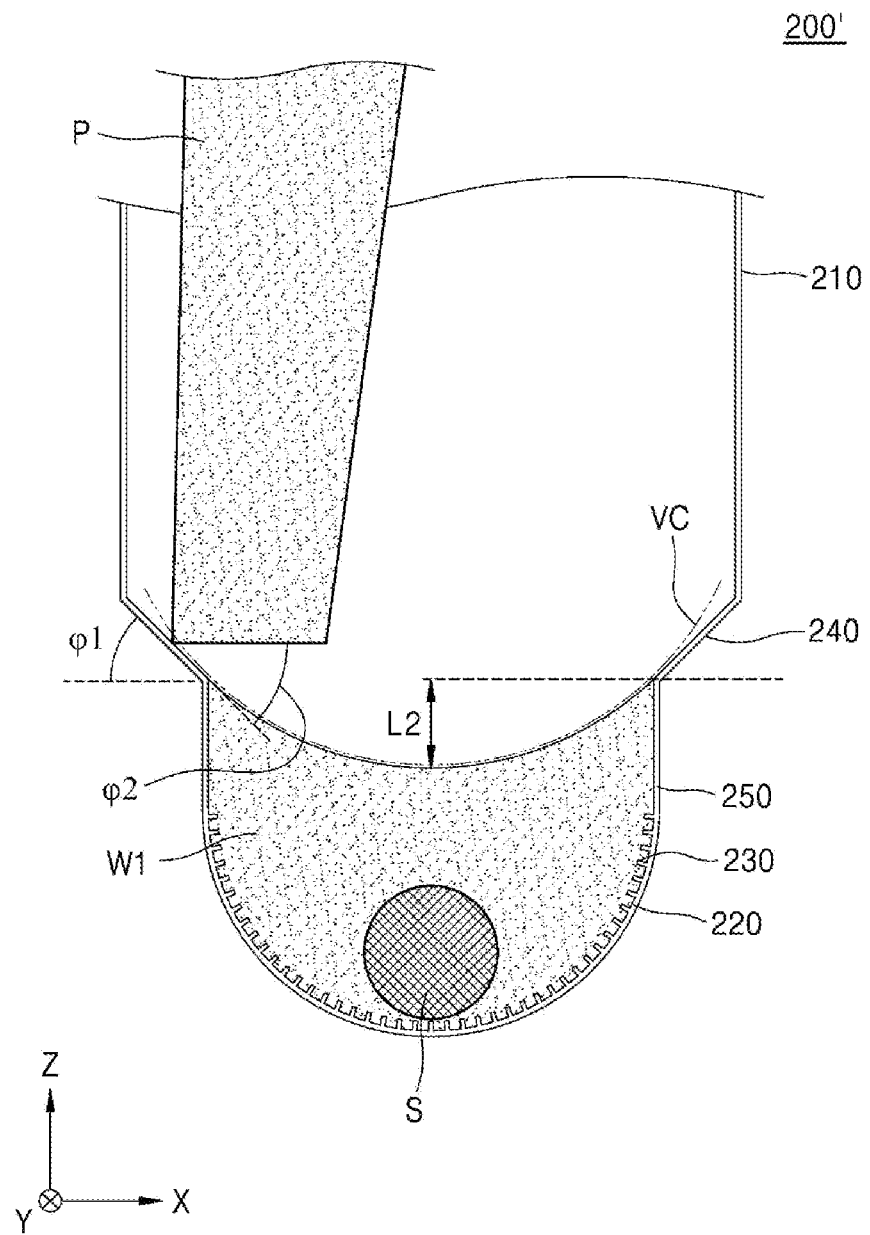
FIG. 8B is a view illustrating the state of the well of FIG. 7 in which a fluid is replaced.

FIG. 7 is view illustrating a well 200' according to another embodiment of the present disclosure, FIG. 8A is a view illustrating the state of a well 200' according to a comparative example in which a fluid is replaced, and FIG. 8B is a view illustrating the state of the well 200' of FIG. 7 in which a fluid is replaced.

Referring to FIG. 7, the well 200' according to another embodiment of the present disclosure may include a guide wall 210, a culture recess 220, a fine pattern 230, a stopper 240, and a meniscus area 250.

The stopper 240 may be disposed to extend from one end of the guide wall 210, and may be disposed successively along the outer circumferential surface of the guide wall 210. In one embodiment, the stopper 240 may be disposed to extend from the lower end of the guide wall 210 towards the inside of the well 200' so as to be inclined at an angle φ1.

The inclination angle φ1 of the stopper 240 is not particularly limited, and may serve to prevent a pipette P from moving in the height direction, for example, the Z-axis direction. In one embodiment, the inclination angle φ1 may be equal to or greater than 30°.

Further, when the inclination angle φ1 of the stopper 240 is excessively large, the inlet of the pipette P may be clogged by the stopper 240, and thus, a fluid W1 may not be smoothly replaced. In one embodiment, the inclination angle φ1 may be equal to or less than 60°.

An angle φ2 is an angle between the stopper 240 and the inlet of the pipette P. The angle φ2 may be equal to the inclination angle φ1. Otherwise, the angle φ2 may be different from the inclination angle φ1 depending on the shape of the inlet of the pipette P or the inclination degree of the pipette P.

The length of the stopper 240 is not particularly limited. The stopper 240 may have a sufficient length not to damage the cells C or the spheroid S even when the fluid W1 is replaced in the state in which the pipette P is located at the lowest part of the stopper 240, in consideration of the sizes and positions of the cells C or the spheroid S.

Through the above-described configuration, the cell culture apparatus 10 according to one embodiment of the present disclosure may prevent the cells or the spheroid S from being damaged during a process of replacing the culture fluid.

More concretely, as shown in FIG. 7, the pipette P may be used to replace the fluid W1 accommodated in the inner space of the well 200'. Here, in the case that there is no stopper 240, the reference position of the pipette P is not set, and thus, the position of the inlet of the pipette P may be varied depending on user's proficiency, repetition of the tests or the like. Thereby, the amount of the fluid W1 which is replaced may be varied depending on user's proficiency.

Further, since the sizes of the cells C or the spheroid S or the depth of the culture recess 220 in which the cells C or the spheroid S is located is excessively small, compared to the length of the pipette P or the total depth of the well 200', the cells C or the spheroid P may be damaged due to contact with the pipette P during a process in which a user manually controls the pipette P. Otherwise, the pipette P absorbs the fluid W1 at a position excessively close to the cells C or the spheroid S, and may thus damage the cells C or the spheroid S.

On the other hand, the well 200' according to one embodiment of the present disclosure includes the stopper 240 which extends from the end of the guide wall 210. Thereby, the user may stably locate the inlet of the pipette P on the stopper 240 along the guide wall 210. Further, since the stopper 240 serves as the reference of the position of the pipette P, the user may locate the inlet of the pipette P at a constant position regardless of user's proficiency or the number of repetitions of the tests.

Therefore, the fluid W1 may be replaced in the state in which the inlet of the pipette P comes into contact with the stopper 240, and thus, the amount of the fluid W1 which is replated may be kept constant. Further, contact between the inlet of the pipette P and the cells C or the spheroid S, or absorption of the fluid W1 through the inlet of the pipette P located at a position excessively close to the cells C or the spheroid S may be prevented.

Referring again to FIG. 7, the meniscus area 250 may be a partial area of the culture recess 220. In one embodiment, the meniscus area 250 may be an area of the culture recess 220, in which the fine pattern 230 is not disposed.

More particularly, the fine pattern 230 is an embossed pattern having the protrusions 231, as described above. Therefore, the contact area between the fine pattern 230 and the fluid W1 is greater than the contact area between the culture recess 220 and the fluid W1 in the case that no fine pattern 230 is formed, and thus, the hydrophobicity of the culture recess 220 is increased. Thereby, in the case that the fine pattern 230 is disposed even on the upper end part of the culture recess 220, as shown in FIG. 8A, the surface of the fluid W1 forms a meniscus which is convex upwards (indicated by a virtual line VC). Here, when the edge of the fluid W1 is located in the upper end part of the culture recess 220, the height of the meniscus formed by the fluid W1 may be L1.

In this case, when the pipette P is located in the center of the well 200' so as to absorb the fluid W1 remaining in the culture recess 220, the inlet of the pipette P becomes excessively close to the spheroid S, and thus, the spheroid S may be moved during a process of absorbing the fluid W1 through the pipette P. Particularly, the size of the inlet of the pipette P is generally greater than the size of the spheroid S, and thus, the spheroid S may be absorbed by the pipette P.

Therefore, in order to avoid influence on the spheroid S during the process of replacing the fluid W1, the user should locate the pipette P at the edge of the meniscus. Thereby, the process of replacing the fluid W1 may be lengthened and complicated, and the amount of the fluid W1 which remains in the culture recess 220 without being replaced may be relatively large.

On the other hand, the well 200' according to one embodiment of the present disclosure includes the meniscus area 250 formed in the upper end part of the culture recess 220 and configured such that the fine pattern 230 is not disposed therein. Thereby, the surface of the fluid W1 forms a meniscus which is convex downwards (indicated by a virtual line VC), as shown in FIG. 8B. Here, when the edge of the fluid W1 is located in the upper end part of the meniscus area 250, the depth of the meniscus formed by the fluid W1 may be L2.

Therefore, the cell culture apparatus 10 according to one embodiment of the present disclosure may replace a large amount of the fluid W1 even in the state in which the inlet of the pipette P is located at the edge of the meniscus of the fluid W1, compared to the case that the meniscus are 250 is not formed. Further, absorption of the cells C or a part of the spheroid S by the pipette P during the process of replacing the fluid W1 may be prevented.

In another embodiment, the well 200' may include both the stopper 240 and the meniscus area 250. More particularly, as shown in FIG. 8B, the meniscus area 250 may be located in the upper end part of the culture recess 220, i.e., on the boundary between the culture recess 220 and the stopper 240. Further, one end of the stopper 240 may be connected to one end of the guide wall 210, and the other end of the stopper 240 may be connected to one end of the meniscus area 250.

Through the above-described configuration, the amount of the fluid W1 which is replaced may be uniformized by specifying the position of the pipette P regardless of user's proficiency and the number of the tests. Further, influence on the spheroid S during the process of replacing the fluid W1 may be more firmly prevented.

Figure 9:
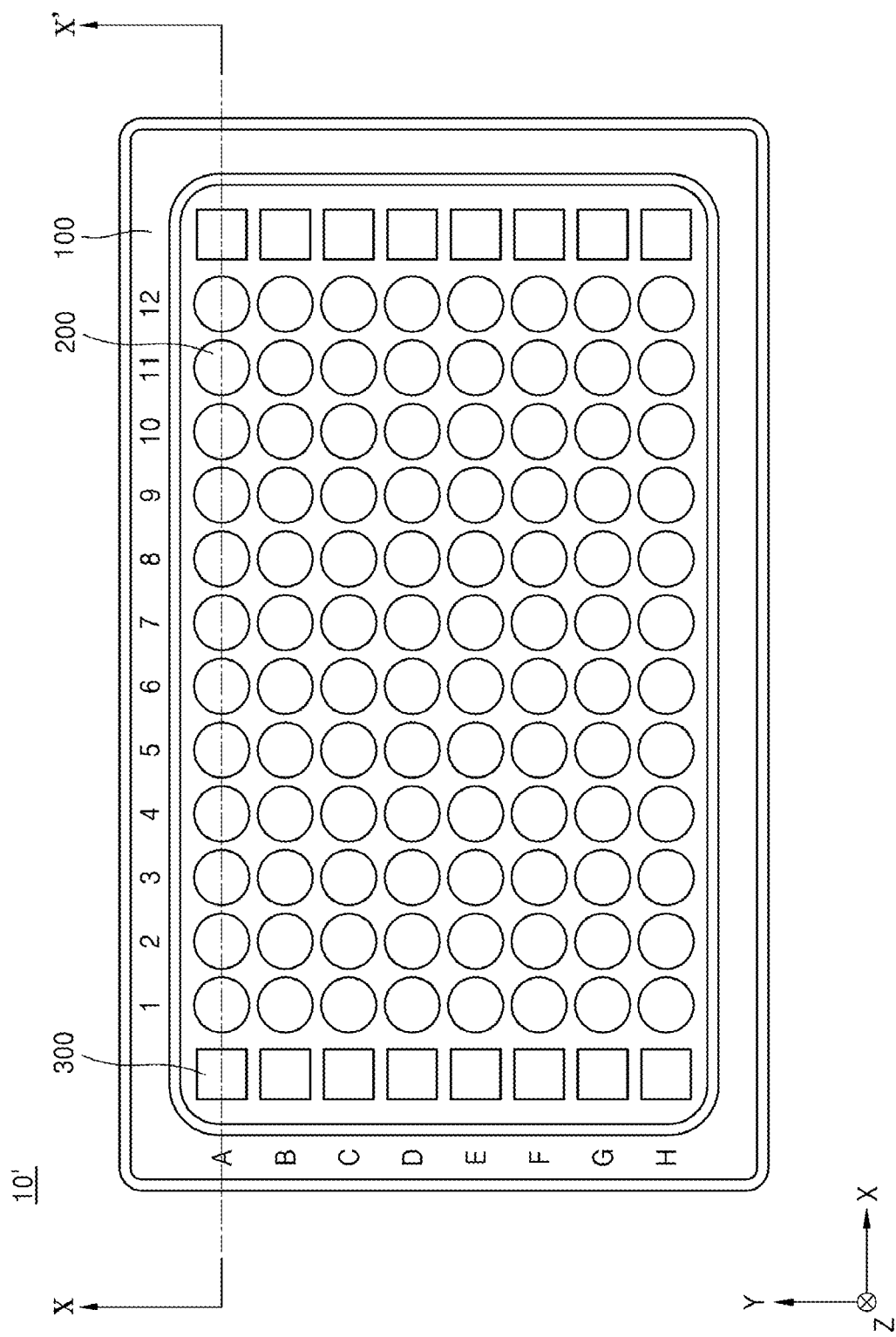
FIG. 9 is a view illustrating a cell culture apparatus according to another embodiment of the present disclosure.
Figure 10:
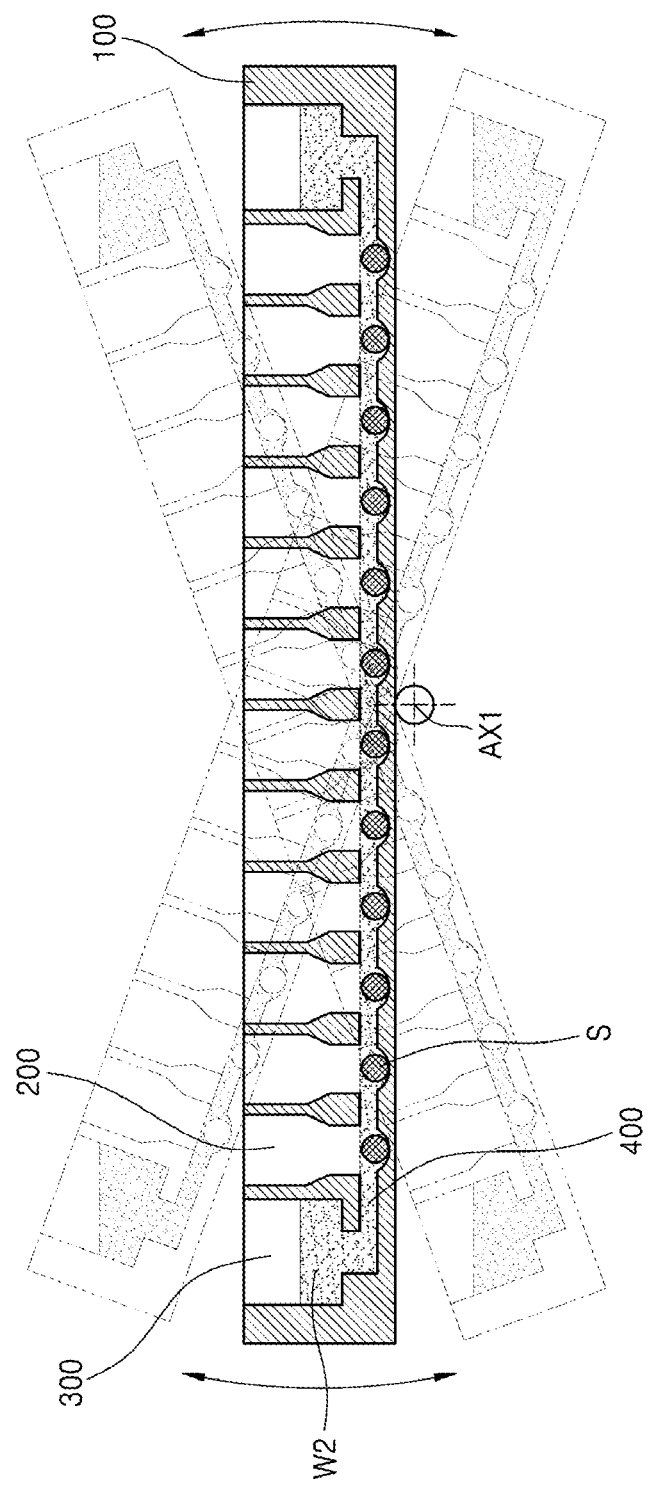
FIG. 10 is a longitudinal-sectional view taken along line X-X' of FIG. 9.

FIG. 9 is a view illustrating a cell culture apparatus 10' according to another embodiment of the present disclosure, and FIG. 10 is a longitudinal-sectional view taken along line X-X' of FIG. 9.

Referring to FIG. 9, the cell culture apparatus 10' may include a plate 100, wells 200, storage tanks 300, and flow channels 400.

The storage tanks 300 may be disposed on the upper surface of the plate 100, and may be disposed close to the wells 200. In one embodiment, as shown in FIG. 9, the storage tanks 300 may be disposed at the right sides of the wells 200 located in column 1 and at the left sides of the wells 200 located in column 12, respectively, in the same number as the number of the columns.

In another embodiment, the storage tanks 300 may be disposed at the upper sides of the wells 200 located in row A and at the lower sides of the wells 200 located in row H, respectively, in the same number as the number of the rows.

As shown in FIG. 10, the storage tanks 30 may store a fluid W2. The fluid W2 may be equal to or different from the fluid W1. In one embodiment, the fluid W2 may be a drug which applies chemical stimulation to the cells C or the spheroids S cultured in the wells 200.

The flow channels 40 may be disposed in the lower region of the inside of the plate 100, and may connect the wells 200 to the storage tanks 300. In one embodiment, the flow channels may be disposed to connect the storage tanks 300 to a plurality of the wells 200 in at least one of the row direction or the column direction.

More concretely, the flow channels 400 may be disposed to extend in the X-axis direction so as to connect the wells 200 disposed in the respective rows to the storage tanks 300. Thereby, the fluid W2 stored in the storage tanks 300 may be transmitted to the respective wells 200.

Although FIGS. 9 and 10 illustrates that the flow channels 400 connect the wells 200 disposed in the respective rows to the corresponding storage tanks 300, the flow channels 400 are not limited thereto. For example, the flow channels 400 may extend in the Y-axis direction so as to connect the wells 200 disposed in the respective columns to the storage tanks 300. Otherwise, the flow channels 400 may extend in the X-axis direction and the Y-axis direction so as to connect the respective wells 200 to the storage tanks 200 in a lattice shape.

In one embodiment, the cell culture apparatus 10' may be rotated about a designated rotation shaft so as to form the flow of the fluid W2. More particularly, as the cell culture apparatus 10' is rotated about a rotation shaft AX1 parallel to the Z-axis, the fluid W2 stored in the storage tanks 300 may flow into the respective wells 200. Such flow of the fluid W2 may be simply formed by tilting the cell culture apparatus 10', and culture of the spheroids S and reaction between the fluid W2 and the spheroids S cultured in the respective well 200 may be easily tested and observed in one cell culture apparatus 10'.

Further, the cell culture apparatus 10' according to one embodiment of the present disclosure may culture different spheroids S in the respective wells 200, thus being capable of implementing a multi-cell network formed by interconnecting the spheroids S through the flow channels 400. Particularly, the cell culture apparatus 10' according to one embodiment of the present disclosure may uniformly control the shapes, sizes and positions of the spheroids S cultured in the respective wells 200, thereby being capable of facilitating repeated reproduction of the multi-cell network.

Although FIGS. 9 and 10 illustrate that the cell culture apparatus 10' includes the wells 200, the cell culture apparatus 10' is not limited thereto. The cell culture apparatus 10' may include various types of plates and wells, may include the wells 200' according to the above-described embodiment.

The cell culture apparatus 10 or 10' according to one embodiment of the present disclosure may form three-dimensional spheroids S, and may prevent the cells C from being adhered to the bottom surfaces of the wells 200 or 200', thereby being capable of uniformly controlling the shapes and sizes of the spheroids S.

The cell culture apparatus 10 or 10' according to one embodiment of the present disclosure may prevent the cells C or the spheroids S from being damaged during the cell culture process, such as replacement of the culture fluid.

The cell culture apparatus 10 or 10' according to one embodiment of the present disclosure may supply a drug to different spheroids cultured in the respective wells 200 or 200' using the flow channels 400, thereby being capable of implementing a multi-cell network.

The cell culture apparatus 10 or 10' according to one embodiment of the present disclosure may form scaffold-free three-dimensional spheroids without hydrogel or chemical pretreatment and without use of an extracellular matrix.

Although the preferred embodiments of the present disclosure have been disclosed for illustrative purposes, those skilled in the art will appreciate that various modifications, additions and substitutions are possible, without departing from the scope and spirit of the disclosure as disclosed 1 in the accompanying claims. Therefore, the scope of the present disclosure is defined not by the detailed description, but by the claims and their equivalents, and all variations within the scope of the claims and their equivalents are to be construed as being included in the present disclosure.

INDUSTRIAL APPLICABILITY

A cell culture apparatus according to the present disclosure may form a scaffold-free 3D cell culture model without use of an extracellular matrix, may culture cells using a culture medium, which does not include a gel component, and may facilitate tests, such as replacement of the medium, so that spheroids may be easily formed and tested. Further, one spheroid may be formed in one well, and thus, respective spheroids may be independently cultured and tested. In addition, the spheroid is mainly formed in the center of the U-shaped bottom of the well due to gravity, the 3D cell culture model having a uniform size may be repeatedly reproduced, and thus, the cell culture apparatus may be easily applied to high-speed analysis using an automation system in optical observation. Moreover, since the cell culture apparatus facilitates a multi-plate drug reaction test and is thus suitable for High Throughput Screening (HTS), and it will be expected that the cell culture apparatus is applicable to various related fields, such as implementation of 3D cell culture models, research and development thereof, drug screening, etc.

The invention claimed is:

1. A cell culture apparatus configured to culture cells so as to form spheroids, the cell culture apparatus comprising:
   a plate; and
   a plurality of wells arranged by a predetermined interval on one surface of the plate, provided to culture cells therein, and configured such that a fine pattern is disposed on inner surfaces of the wells so as to space the inner surfaces of the wells apart from the cells,
   wherein each of the wells comprises:
   a guide wall formed in a cylindrical shape; and
   a culture recess configured to extend from one end of the guide wall, and formed in a downward convex shape so that the cells are aggregated in a center of the culture recess,
   wherein the fine pattern is configured such that a plurality of protrusions and a plurality of depressions are repeatedly arranged on an inner surface of the culture recess,
   wherein the protrusions protrude from the inner surface of the culture recess towards a center of the culture recess, and each of the protrusions has a contact surface configured to come into contact with the cells; and a total area of the contact surfaces of the protrusions is equal to or less than a half of an entire area of the inner surface of the culture recess,
   wherein the protrusions have a shape configured such that a width thereof is gradually reduced in a direction towards the center of the culture recess.

2. The cell culture apparatus according to claim 1, wherein:
   the fine pattern comprises a support disposed on the inner surface of the culture recess; and
   the protrusions extend from the support, and protrude towards a center of the culture recess.

3. The cell culture apparatus according to claim 1, wherein each of the wells further comprises a stopper disposed between the end of the guide wall and an end of the culture recess, and inclined towards an inside of a corresponding one of the wells at a predetermined angle.

4. The cell culture apparatus according to claim 1, wherein each of the wells further comprises a meniscus area disposed in an upper end part of the culture recess, and configured such that the fine pattern is not formed in the meniscus area.

5. The cell culture apparatus according to claim 1, wherein the fine pattern is formed integrally with the wells.

6. The cell culture apparatus according to claim 1, wherein the wells are arranged in a plurality of rows and a plurality of columns on an upper surface of the plate,
   the cell culture apparatus further comprising:
   storage tanks disposed on an upper surface of the plate so as to accommodate a fluid; and
   flow channels configured to connect the storage tanks to the plurality of wells in at least one of a row direction or a column direction so as to supply the fluid to the plurality of wells.

7. The cell culture apparatus according to claim 6, rotated with respect to a designated rotation shaft so as to form a flow of the fluid.

* * * * *